United States Patent [19]

Schöening et al.

[11] Patent Number: 4,477,409
[45] Date of Patent: Oct. 16, 1984

[54] REINFORCED CONCRETE PRESSURE VESSELS FOR NUCLEAR REACTOR INSTALLATIONS

[75] Inventors: Josef Schöening, Hambruecken; Hans-Georg Schwiers; Paul Mitterbacher, both of Ketsch, all of Fed. Rep. of Germany

[73] Assignee: Hochtemperatur-Reaktorbau GmbH, Cologne, Fed. Rep. of Germany

[21] Appl. No.: 229,767

[22] Filed: Jan. 29, 1981

[30] Foreign Application Priority Data

Mar. 14, 1980 [DE] Fed. Rep. of Germany ....... 3009826

[51] Int. Cl.³ ............................................. G21C 13/04
[52] U.S. Cl. .................................................. 376/296
[58] Field of Search ................................ 376/294–296, 376/273, 291–292, 285

[56] References Cited

U.S. PATENT DOCUMENTS

| | | | |
|---|---|---|---|
| 3,497,421 | 2/1970 | Thome | 376/296 |
| 3,816,246 | 6/1974 | Kumpf | 376/295 |
| 3,991,899 | 11/1976 | Vaessen | 376/285 |
| 4,032,397 | 6/1977 | Beine et al. | 376/293 |
| 4,035,974 | 7/1977 | Kumpf | 376/296 |

FOREIGN PATENT DOCUMENTS 2825934 5/1979 Fed. Rep. of Germany ...... 376/396

*Primary Examiner*—Sal Cangialosi
*Attorney, Agent, or Firm*—Schwartz, Jeffery, Schwaab, Mack, Blumenthal & Koch

[57] ABSTRACT

A pressure vessel for a nuclear reactor comprises a reinforced concrete vessel with at least one open area located in the wall of the concrete vessel, a lining means anchored on the inside surface of the concrete vessel and the opea area for protection of the surfaces and at least one expansion space in the concrete vessel immediately adjacent the lining means to permit movement of the lining means and distribution of the stresses in the lining means under various reactor conditions.

16 Claims, 2 Drawing Figures

REINFORCED CONCRETE PRESSURE VESSELS FOR NUCLEAR REACTOR INSTALLATIONS

BACKGROUND OF THE INVENTION

1. Field of the Invention

The invention concerns a vessel, in particular a reinforced concrete pressure vessel for nuclear reactor installations, with one or a plurality of internal chambers and with open areas or passages through the wall of the reactor. More specifically, the invention concerns an arrangement wherein the internal chamber or chambers, passages through the wall and/or open areas in the wall are provided with a lining means. This liner is anchored in the concrete and possibly cooled by means of cooling tubes on the side facing the concrete. Spaces are provided in the concrete to relieve stresses on the liners, anchors, joints and cooling tubes encountered under the various reactor conditions.

2. Background of the Prior Art

In reinforced concrete pressure vessels for nuclear reactor installations it is necessary to introduce measures for the purpose of preventing to the extent possible the deformation of the steel liner and parts associated with it. In the course of the construction of a reinforced concrete pressure vessel, the concrete undergoes a drying phase, a prestressing operation and a shrinkage of the concrete. These changes are taking place in the concrete structure and consequently give rise to forces acting both on the liner and the steel components which are rigidly connected both with the reinforced concrete pressure vessel and the liner. Certain components, for example, fastening anchors, are particularly exposed to forces which may lead to excessive stresses or to mechanical damage.

On the other hand during the operation of the nuclear reactor, certain pressure and temperature changes act continuously on the liner. Differential expansions between the liner and the reinforced concrete are frequently introduced. This generates forces between the reinforced concrete and the liner which again may lead to the excessive stressing or damaging of the liner, the anchoring structure or the concrete structure.

SUMMARY OF THE INVENTION

It is an object of the present invention to provide a vessel of the above-mentioned type, wherein no excessive stressing of, or damage to, the lining means and its connecting or anchoring components or the reinforced concrete may occur as the result of the causes described hereinabove.

This object is attained according to the invention by providing expansion spaces at the angle locations of the liner and/or the areas of the connections of the liners in the passages or open areas with the liner of the vessel. The expansion spaces may be hollow spaces provided on the steel liners, for example, and/or in the external wall of the reinforced concrete pressure vessel.

Another object of the invention is to advantageously provide the expansion spaces at the areas of the connections of the fastening anchors of the lining means such as steel anchors for steel liners and/or the cooling tubes.

These and other objects of the present invention are accomplished by the particular arrangement and design of the components in the pressure vessel for a nuclear reactor installation. The vessel comprising a reinforced concrete vessel contains at least one open area located in the wall of the concrete vessel. Under most conditions, several open areas will be provided for housing the various reactor components and for providing gas transport conduits and other components such as cooling tubes and the like. The internal cavity of the reinforced concrete vessel is provided with a lining means anchored to the inside surfaces of the concrete vessel. Similarly, the open areas, such as the conduits and cavities for reactor components, are also provided with a lining anchored to the concrete surfaces. The lining means preferably comprises a steel liner with steel anchors attached thereto and embedded in the concrete. The steel liner is preferably welded at the areas of intersection and junctions of the various steel plates forming the liner. For example, a steel liner for a conduit passage in the wall of the reinforced concrete vessel intersects with, and is welded to, the steel liner for the main vessel cavity. In the area of intersections or junction of the lining means, it is advantageous to provide an expansion space in the concrete immediately adjacent the lining means. The expansion space is of sufficient dimension to permit movement of the lining means and thereby enable the distribution of stresses in the lining means.

The utilization of expansion spaces is also advantageous in the areas of the vessel requiring the lining means to be curved or bent. Similar application of the expansion space is highly advantageous also in connection with the anchoring means. For example, expansion areas are provided adjacent the steel anchor embedded in the concrete vessel. Where cooling tubes are provided between the lining means and the concrete vessel, expansion areas are likewise highly advantageous.

The expansion areas are, in one preferred embodiment, bounded by a steel insert and in another preferred embodiment, filled with a plastic or elastic material.

Certain advantages afforded by the invention include the prevention of distortions and shearing of components in the areas exposed to increased stresses generated by strong mutual force effects between the liner and the reinforced concrete. In addition, the concrete structure and the steel components are generally protected against excessive stress. The stresses generated may be distributed by means of the choice of the material and the dimensions of the elements over several components or the stresses may be distributed especially for predetermined components and aligned correspondingly. For example, the alignment of stresses in the concrete over individual anchors or over a plurality of predetermined anchors combined with an arrangement of filled expansion spaces is capable of preventing the overloading of anchors. In this manner, definite deformations and a more directed distribution of stress over several anchors is attained.

Furthermore, the measures according to the invention act to protect built-in high precision components against objectionable deformation.

BRIEF DESCRIPTION OF THE DRAWINGS

Certain embodiments of the invention are represented in the drawings and shall be explained in more detail hereinafter.

DETAILED DESCRIPTION OF PREFERRED EMBODIMENTS

Figure 1:
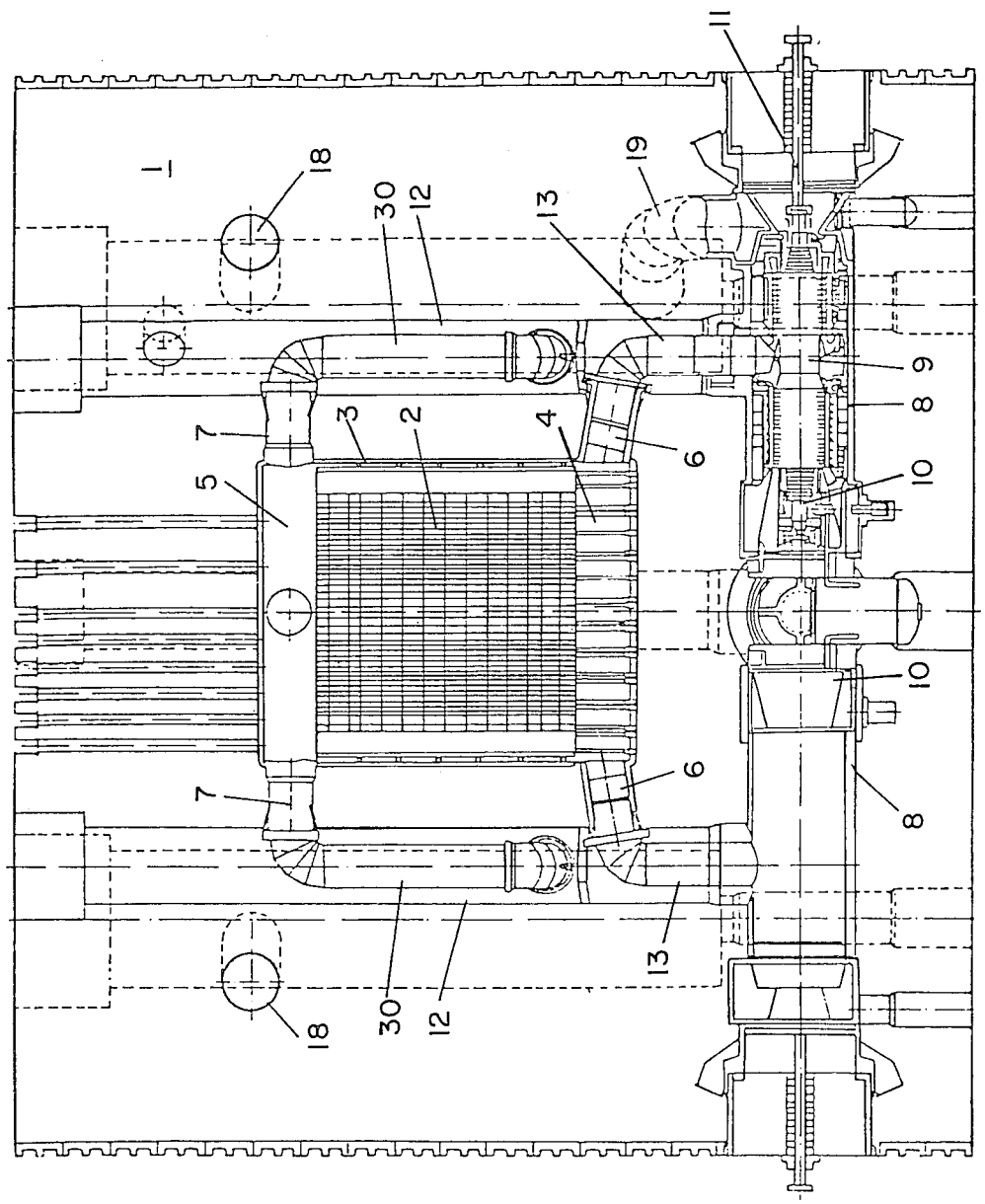
In FIG. 1, a portion of the reinforced concrete pressure vessel housing a reactor installation is shown in a vertical cross section.

FIG. 1 shows a pressure tight vessel 1 of cylindrical shape made of reinforced concrete installed centrally inside a cylindrical safety vessel (not shown) likewise made of reinforced concrete. Pressure vessel 1 encloses a nuclear reactor 2 together with the primary circuit which is comprised of three thermodynamic circuits coupled to the nuclear reactor 2. Each circuit comprises a tubrine, a compressor, a recuperator and a cooler, as will be described in further detail below. Also installed inside the safety vessel 1 are all active gas-carrying auxiliary components, as well as the devices required for completion of primary circuit components.

The nuclear reactor 2, which is installed in cavity 3, is a graphite modified, helium-cooled high temperature reactor having fuel elements which are either ball-shaped or block-shaped. Beneath the floor of the reactor 4 is a hot gas collection chamber 4 which receives the hot gas released by the reactor core. Above the reactor core 2 is a cold gas collection chamber 5 which accumulates cold gas returning from the main circuit before it re-enters the core. Reactor 2 is connected to the three primary circuits by three radially placed outlet pipes 6 and an equal number of inlet pipes 7. Each of the pipes 6 and 7 are housed in open areas in the reinforced concrete vessel 1.

Perpendicularly under the high temperature reactor 2 and at a distance adequate to assure positive shielding three horizontal open areas preferably referred to as pods 8 are built inside the concrete housing 1. These pods are built in a star-shaped or radial pattern and converge at the vertical central axis of the vessel 1. Other patterns may advantageously permit a more compact arrangement within the pressure vessel. Inside each pod a single-phase gas turbine 9 is installed on a common shaft with compressor 10. Each turbine 9 is coupled to a generator (not shown), mounted inside the safety vessel.

Above each turbine extends a vertical gas transport conduit directly connected with the horizontal pod 8 at its lower end and the reactor inlet pipes 7.

Additional open areas are utilized in the concrete pressure vessel for housing pipes or conduits connecting the various components of the thermodynamic circuits. Gas transport pods 12 house hot gas pipes 13. Each of the hot gas pipes connect one of the reactor's outlet pipes 6 with one of the gas turbines 9.

In the upper section of the reinforced concrete pressure vessel 1 three horizontal conduits 18 are provided to convey the gas from the recuperator to the cooler in each loop. An additional gas duct 19 connects each turbine 9 with a recuperator 16 of the same circuit.

The conduit, as well as the vertical and horizontal cavities and reactor cavity, are lined with gas tight steel liners (not shown) which are heat insulated and cooled by water. The presence of the metal liners in the conduits and cavities under less pressure and stressing calls for an arrangement according to the present invention wherein areas of higher stress can be selectively protected.

Figure 2:
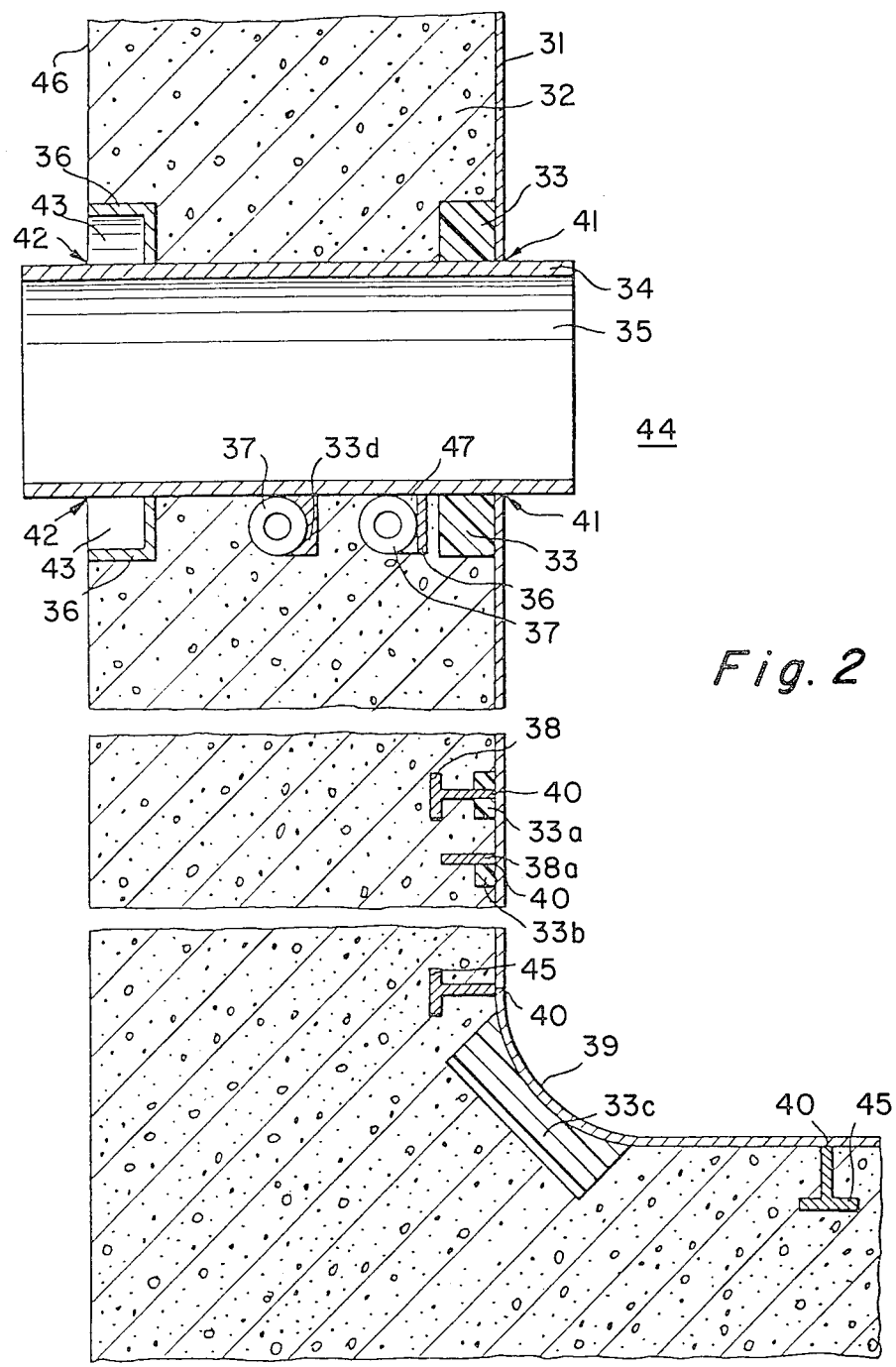
FIG. 2 discloses in detail a portion of the concrete wall and steel liner of a reinforced concrete pressure vessel according to the invention.

In FIG. 2 a portion of a reinforced concrete pressure vessel 32 is shown equiped with a wall passage 35. Several wall passages and other open areas are present (but not illustrated) serving a variety of purposes, for example, the installation of reactor components, the introduction of measuring instruments or as conduits for the passage of cooling media. The liners 34 of the wall passages 35 are joined by welding with the liner 31 at the connections 41. In order to relieve the stress on these locations during expansion of the liner 31, materials 33 are provided which prevent direct contact between the concrete structure and the liner and allow the partially independent deformation of the concrete structure and the liner. The other end of the wall passages 35 are be designed advantaeously so that a hollow expansion space 43 is formed between the passage liner 34 and the reinforced concrete pressure vessel 32. The hollow expansion space is bounded by steel inserts 36. The cooling tubes 37 are equipped on the same principle with the hollow expansion spaces which may be filled with insert elements 33d.

It is the function of the fastening anchors 38, 38a and 45 to insure the permanent, intimate joining of the liner 31 with the reinforced concrete pressure vessel 32. Conventional anchors 45, shown for the sake of comparison in FIG. 2, are surrounded continuously by reinforced concrete and permit only very slight relative movements between the liner and the reinforced concrete. These anchors may be exposed to very high stresses that under certain conditions may exceed their permissible magnitude. Anchors 38 and 38a according to the invention are protected against these high stresses by the expansion spaces 33a and 33b.

According to the invention, locations 40 where the anchors join the concrete and steel liner are surrounded in part by elastic or plastic material 33. This permits the fastening anchors 38 and 38a to adequately adapt themselves to the stresses without being overloaded or damaged.

The fastening anchors 38a which encounter stresses predominantly in a single direction only, may be provided correspondingly in a partial area of the joint location 40 only with an elastic or plastic material 33b.

In order to avoid stresses concentrations at the angle locations 39 of the liner 31, a corresponding expansion space between the liner 31 and the reinforced concrete pressure vessel 32 is also filled with an elastic or plastic material 33c.

Numerous additional embodiments will become apparent to the artisan and are encompassed by the invention.

We claim:

1. A pressure vessel for a nuclear reactor installation comprising a reinforced concrete vessel, at least one open area located in the wall of said concrete vessel, lining means immediately adjacent the surfaces of said open area for protection of said surfaces and anchored in the wall of said concrete vessel, said lining means being directly contacted by the cooling medium of the nuclear reactor and a space between the concrete of said concrete vessel and said lining means which is void of concrete in at least one particular area, said space being of a dimension to permit movement of said lining means independent of the concrete and to permit directed distribution of stresses in said lining means.

2. A pressure vessel for a nuclear reactor installation of claim 1 wherein said open area comprises at least one gas conduit.

3. A pressure vessel for a nuclear reactor installation of claim 1 wherein said open area comprises at least one chamber for a reactor component.

4. A pressure vessel for a nuclear reactor installation of claim 1 comprising a plurality of open areas in the form of conduits and chambers.

5. A pressure vessel for a nuclear reactor installation of claim 1 comprising a plurality of said spaces between said concrete and said lining means.

6. A pressure vessel for a nuclear reactor installation of claim 1, 4 or 5 wherein said lining means is a steel liner.

7. A pressure vessel for a nuclear reactor installation of claim 6 wherein said steel liner is anchored to said concrete vessel by a plurality of anchors, each anchor fixedly attached at one end to said steel liner and embedded at the other end in said concrete.

8. A pressure vessel for a nuclear reactor installation of claim 7 wherein at least one space between said concrete and said lining means is bounded by a steel insert.

9. A pressure vessel for a nuclear reactor installation of claim 7 wherein at least one space between said concrete and said lining means is filled with a material capable of distributing the stress of said steel lining.

10. A pressure vessel for a nuclear reactor installation of claim 9 wherein said material capable of distributing the stress of said steel lining is an elastic material.

11. A pressure vessel for a nuclear reactor installation of claim 9 wherein said material capable of distributing the stress of said steel lining is a plastic material.

12. A pressure vessel for a nuclear reactor installation of claim 9 wherein at least one filled space is immediately adjacent at least one of said anchors.

13. A pressure vessel for a nuclear reactor installation of claim 9 wherein at least one filled space is immediately adjacent a curvature in said steel liner.

14. A pressure vessel for a nuclear reactor installation of claim 9 further comprising cooling tubes disposed between said steel liner and said inside surfaces wherein at least one filled space is immediately adjacent said cooling tubes.

15. A pressure vessel for a nuclear reactor installation of claim 9 wherein the steel liner anchored to said inside surfaces of said concrete vessel and the steel liner anchored to said inside surfaces of said open area meet in at least one intersection and wherein at least one filled space is immediately adjacent said intersection.

16. A pressure vessel for a nuclear reactor installation of claim 7 wherein at least one space is immediately adjacent at least one of said anchors, at least one space is immediately adjacent a curvature in said steel liner, at least one space is immediately adjacent cooling tubes disposed between said steel liner and said inside surfaces and at least one space is immediately adjacent the area of intersection of said steel liner anchored to said inside surfaces of said concrete vessel and said steel liner anchored to said inside surfaces of said open area.

* * * * *